United States Patent
Lakkundi et al.

(10) Patent No.: US 11,562,069 B2
(45) Date of Patent: Jan. 24, 2023

(54) BLOCK-BASED ANOMALY DETECTION

(71) Applicant: KYNDRYL, INC., New York, NY (US)

(72) Inventors: Abdul Kareem Lakkundi, Gadag (IN); Siddalinga Aradhya, Bengaluru (IN); Santosh Kulkarni, Mysuru (IN)

(73) Assignee: KYNDRYL, INC., New York, NY (US)

( * ) Notice: Subject to any disclaimer, the term of this patent is extended or adjusted under 35 U.S.C. 154(b) by 159 days.

(21) Appl. No.: 16/925,461

(22) Filed: Jul. 10, 2020

(65) Prior Publication Data

US 2022/0012336 A1 Jan. 13, 2022

(51) Int. Cl.
*G06F 21/56* (2013.01)
*G06N 5/04* (2006.01)
*G06N 20/00* (2019.01)

(52) U.S. Cl.
CPC .......... *G06F 21/566* (2013.01); *G06F 21/561* (2013.01); *G06F 21/564* (2013.01); *G06F 21/565* (2013.01); *G06N 5/04* (2013.01); *G06N 20/00* (2019.01); *G06F 2221/034* (2013.01)

(58) Field of Classification Search
CPC ........... G06F 2201/83; G06F 2201/034; G06F 21/566; G06F 21/561; G06F 21/564; G06F 21/565; G06K 9/00; H04L 63/1416; H04L 41/069; H04L 43/08; H04L 47/823; G06N 20/00; G06N 5/04; H04W 12/12
See application file for complete search history.

(56) References Cited

U.S. PATENT DOCUMENTS

| | | | |
|---|---|---|---|
| 9,177,139 B2 | 11/2015 | Hull Roskos | |
| 9,298,914 B1 | 3/2016 | McCorkendale | |
| 2007/0028220 A1* | 2/2007 | Miller | G05B 23/0278 717/124 |
| 2016/0036837 A1 | 2/2016 | Jain et al. | |
| 2017/0010930 A1 | 1/2017 | Dutta et al. | |
| 2018/0316707 A1* | 11/2018 | Dodson | H04L 41/145 |
| 2019/0081876 A1 | 3/2019 | Ghare et al. | |
| 2019/0188376 A1 | 6/2019 | Marcu et al. | |

(Continued)

FOREIGN PATENT DOCUMENTS

| | | | |
|---|---|---|---|
| WO | 2017090045 A1 | 6/2017 | |
| WO | 2019035120 A1 | 2/2019 | |

OTHER PUBLICATIONS

"5 Ways to Detect A Cyber Attack," Cisco, Printed: May 1, 2020, 2 pages. https://www.cisco.com/c/dam/m/en_ca/business-transformation/pdf/5-ways-to-detect-a-cyber-attack.pdf.

(Continued)

*Primary Examiner* — Brian F Shaw
(74) *Attorney, Agent, or Firm* — John Kennel; Andrew M. Calderon; Calderon Safran & Cole P.C.

(57) ABSTRACT

A plurality of blocks of a first storage device are monitored. The first storage device is related to a computer system. A subset of blocks of the plurality a compared to a first storage signature of the first storage device. Based on the comparing of the subset of blocks to the first storage signature, a security anomaly is determined on the computer system. In response to the security anomaly, a security action is performed. The security action is related to the computer system.

18 Claims, 7 Drawing Sheets

(56) References Cited

U.S. PATENT DOCUMENTS

2020/0034537 A1* 1/2020 Chen .................. G06F 21/56
2020/0287921 A1* 9/2020 Karin ................ H04L 63/1466

OTHER PUBLICATIONS

"Get the Best Family of Cybersecurity and Compliance Solutions with Tripwire," Printed: May 1, 2020, 3 pages. https://www.tripwire.com/solutions/.

"Is anyone familiar with analyzing and detecting cloud anomalies using anomaly detection?" ResearchGate Post, Printed: Mar. 3, 2020, 5 pages.

Anonymous, "Inline cyber resiliency for async replication in a three-site replication," An IP.com Prior Art Database Technical Disclosure, IP.com No. IPCOM000260259D, Nov. 8, 2019, 4 pages.

Anonymous, "Method and System for Dynamic Identification of Cyber Threats by Ingesting Backup Data," An IP.com Prior Art Database Technical Disclosure, IP.com No. IPCOM000258575D, May 24, 2019, 3 pages.

Barbhuiya et al., "RADS: Real-time Anomaly Detection System for Cloud Data Centres," arXiv:1811.04481v1, Nov. 11, 2018, pp. 1-15.

Khimji, "Cybercrime Is Now More Profitable Than The Drug Trade," Tripwire—The State of Security, Mar. 30, 2015, 7 pages. https://www.tripwire.com/state-of-security/regulatory-compliance/pci/cybercrime-is-now-more-profitable-than-the-drug-trade/.

Shinder, "What makes cybercrime laws so difficult to enforce," TechRepublic, Jan. 26, 2011, 10 pages. https://www.techrepublic.com/blog/it-security/what-makes-cybercrime-laws-so-difficult-to-enforce/.

Mell et al., "The NIST Definition of Cloud Computing", Recommendations of the National Institute of Standards and Technology, Special Publication 800-145, Sep. 2011, 7 pages.

International Search Report and Written Option of the International Searching Authority from PCT Application No. PCT/CN2021/099067 dated Sep. 7, 2021, 9 pages.

* cited by examiner

BLOCK-BASED ANOMALY DETECTION

BACKGROUND

The present disclosure relates to computer security, and more specifically, to anomaly and threat detection based on storage block analysis and machine learning.

Anomaly detection may be the analysis, scanning, and detection of various security issues related to computer systems. Security anomalies may be software or hardware threats to computer security and may come in the form of viruses, trojans, malware, or other kinds of attacks towards a computer system. Often, the performance of anomaly detection may be based on application or file-specific monitoring and verification.

SUMMARY

According to embodiments, disclosed are a method, system, and computer program product. A plurality of blocks of a first storage device are monitored. The first storage device is related to a computer system. A subset of blocks of the plurality are compared to a first storage signature of the first storage device. Based on the comparing of the subset of blocks to the first storage signature, a security anomaly is determined on the computer system. In response to the security anomaly, a security action is performed. The security action is related to the computer system.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
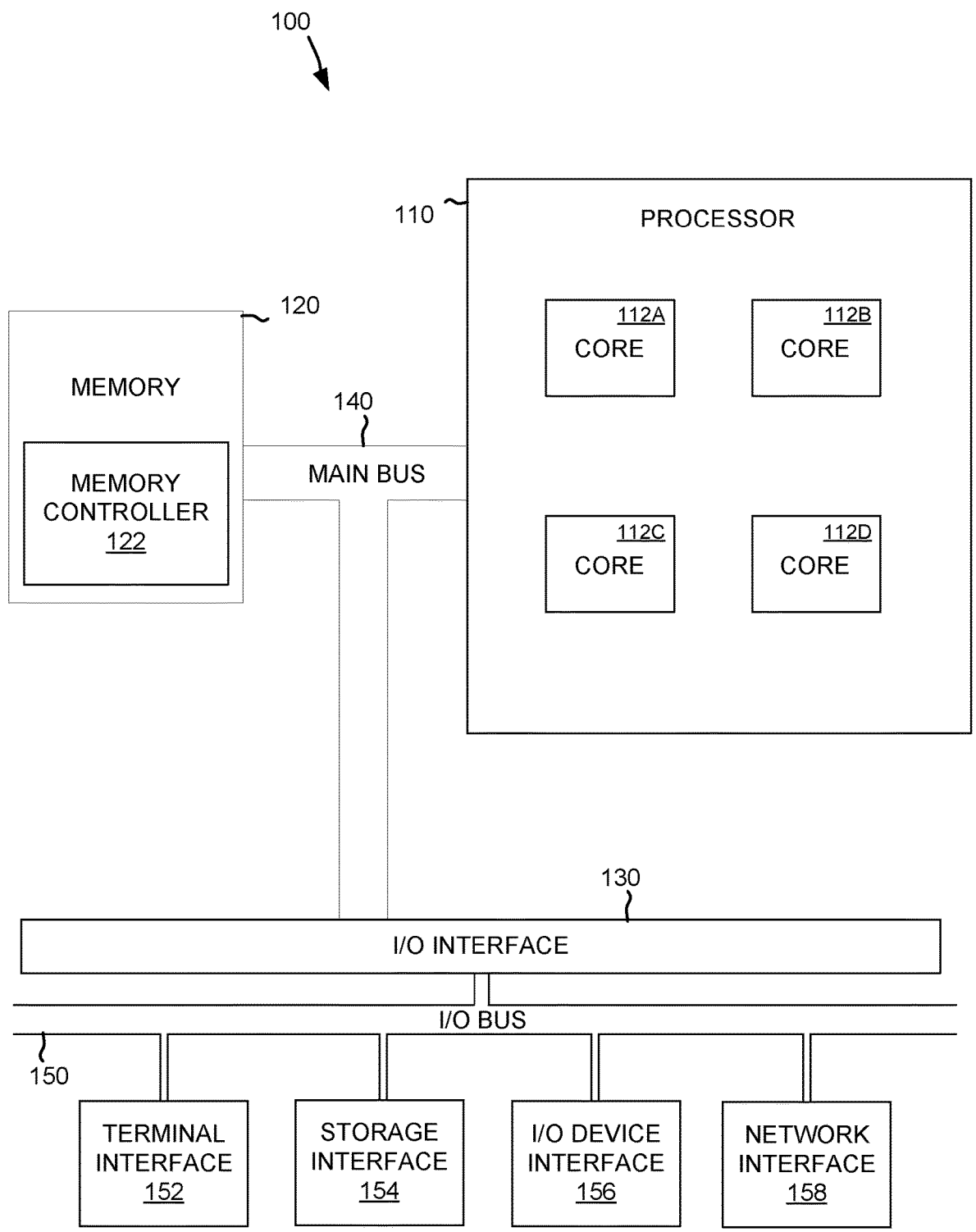
FIG. 1 depicts the representative major components of an example computer system that may be used, in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to computer security; more particular aspects relate to anomaly and threat detection based on storage block analysis and machine learning. While the present disclosure is not necessarily limited to such applications, various aspects of the disclosure may be appreciated through a discussion of various examples using this context.

Anomaly detection may be the analysis, scanning, and/or detection of various security issues related to computer systems. Computer security anomalies (alternatively, security anomalies or anomalies) may be software, hardware, or a combination of threats to a computer system. Security anomalies may come in the form of viruses, trojans, malware, or other kinds of attacks towards a computer system. Security anomalies may include accessing, stealing, deleting, encrypting, or otherwise tampering with certain files, programs, or operating system components. As the usage of computers becomes more necessary to daily life (such as financial banking and basic infrastructure operations) it may be imperative that computers operate securely and reliably.

Many anomaly detection techniques are primitive and not equipped to address computer security threats and to quickly identify the numerous security anomalies that are continuously afflicting computer systems. Anomalies operate, in some cases, by tampering with a certain file or performing one or more modifications to a program. Sometimes, an anomaly may operate by accessing an associated permission/setting/metadata associated with a file, program, or portion of an operating system of a computer.

Often, the performance of anomaly detection may be based on application or file-specific monitoring. There are drawbacks to application-specific or file-specific monitoring. As threats change in the files and applications they attack, the application/file-specific monitoring may lag behind and not detect a changed computer system. For example, an application/file-specific anomaly detection may operate by verifying the integrity of a library file of an application. If the application is updated or changed (e.g., through a software patch from the application developer), the application/file-specific anomaly detection may no longer be able to identify the anomaly. In some instances, the detection may fail because there is a location change, such as a user or program moving files to a different location or directory inadvertently. Further, application/file-specific monitoring may be computationally intensive. For example, the software monitoring may take place at an application level on a computer system. Sometimes, there may be multiple monitors that operate for each application, file, folder, database that a computer operator wishes to monitor. Each of these multiple monitors may take excessive processing and memory resources, which may slow the performance and responsiveness of the computer system.

One technique may be the performance of rule-based anomaly detection. To identify the particular anomaly, many anomaly detection techniques rely on a constant stream of maintenance for proper operation. For example, an antivirus program creator may employ a workforce of many users for each and every identified anomaly. Specifically, each identified anomaly may be based on one or more rules that are created by the antivirus developers. The rules may include file-based, application-based, or directory-based access or modification. One drawback to the rule-based anomaly detection techniques is that an entire workforce of users may be employed to develop rules for each and every anomaly. This workforce may be costly. A second drawback is that the rules may only be able to detect an already known or identified anomaly. The requirement that an anomaly may significantly weaken the likelihood that a rule-based anomaly detection technique stops the majority of computer security threats. For example, new anomalies are being developed by malicious parties almost constantly (such as monthly, weekly, and the like).

In rule-based and application/file-based anomaly detection there may be the drawback of timeliness. Specifically, these anomaly detections techniques are only capable of detecting anomalies after a successful tampering of one or more files/applications/operations of a computer system. Practically, the detection through rule-based or application/file-based may be too late to be meaningful. For example, a server or database may be tampered with and one or more of the files may be locked, deleted, encrypted, or otherwise altered such that the computer system is no longer accessible or the data is not recoverable. This may lead to a significant downtime.

A block-based anomaly response (BBAR) system may overcome the drawbacks to other anomaly detection techniques. A BBAR may operate at a block level of storage devices that are a part of a computer system. For example, each file, folder, database, and application may be stored at an operating system level as a series of blocks of a file system. The blocks may have relevance to each other but may not have any direct information regarding the applications and files of the system. The BBAR may operate by tracking the changes to each block continuously. In some embodiments, the BBAR may operate by tracking the changes to each block at periodic intervals or snapshots.

The BBAR may generate a signature of the storage system of a computer system by monitoring the storage devices during a given period. The given period may be a training period, and the BBAR may generate the signature by generating a model of the various writes during the training period. The training period may yield a signature that represents a baseline for the various writes to each of the blocks of a storage device over a given period. The BBAR may generate a single signature for all of the one or more storage devices that are connected to a computer system. In some embodiments, the BBAR may generate a signature for each storage device that is connected to a computer system.

The modeling techniques may rely on a machine learning of historical data, (e.g., the number of writes that are performed at a particular period of time for each block or group of blocks of each storage device of a computer system). The signature the computer system and its operation may be from a block-based perspective. Specifically, the BBAR may operate by machine learning on the historical data using one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning techniques.

The block-based signature machine learning (e.g., based on monitoring of standard behavior and model generation) of the BBAR may have many advantageous in performing anomaly detection. One benefit is the block-based model comparison operations may be resource advantageous. The BBAR may be embodied at a file-system driver level process with little overhead of memory and processor utilization.

Another advantage of BBAR is that the performance of anomaly detection may be application agnostic. For example, block-based modeling of the computer system may be performed without knowledge of applications, files, folders, names, metadata, or any other file-level information of the computer system. This may be advantageous because while the specifics of certain anomalies may be based on specific files, specific versions of various software, or the location of various layouts of software components, the BBAR may perform detection at a general level without viewing this file/application/process-level information. If a filename changes, for example, the BBAR may be able to track the file's write frequency or write load at the block level without being confused or losing track of the file through the rename (as the BBAR does not know the file name during performance monitoring for and detecting anomalies). This anomaly detection operation at the block-level of data may be resilient to many types of organic or malicious operations. For example, files and applications may be updated through patches, upgrades, normal data collection from processing, or other benign ancillary behavior. The benign ancillary behavior may be modeled by the BBAR as part of normal baseline operation of the computer system. This builds in the behavior and changing nature of files through their lifecycle due to normal computer usage. A subsequent deviation from this ancillary behavior may be detected by comparing operation of the computer systems at the block level to the updated model. Likewise, future iterations of benign ancillary behavior may not deviate from the model.

Yet another advantage of the BBAR is that the model may be updated during operation of the computer system, removing the coupling of a computer system to the need for constantly maintaining a database of fresh antivirus and other malware rules for detection—for example, as a computer using the BBAR operation. If a deviation from the baseline signature is determined, the BBAR may request verification (e.g., through prompting a user or running a secondary antivirus program). If through the requesting, the BBAR determines that the deviation from the signature is due to a benign behavior, the model of the signature may be updated to include this benign behavior.

Further beneficially, the update to the model is again block-based in nature. This is helpful as a one modification from one anomaly versus another anomaly may look or seem different from a file/application/service level of the computer system but may result in a similar modeling at the block level of the storage device. For example, every three weeks a computer system may run a versioning operation on a log file on the internal primary storage drive; the log file may be renamed from "log_2019_10.txt" to "log_2019_11.txt" on the computer system. The initial model of the signature may have been trained over a two-week period of operation, and the less frequent versioning operation of the log file may not have been a part of the block-based generation of the signature. The BBAR may update the model to include the versioning operation of the log file at the block level of the storage device. As the model is now updated, the block activity related to the renaming may be updated into the model. If the log file is renamed again from "log_2019_11.txt" to "log_2020_01.txt" on the computer system, the pattern of the name change may be different from the previous log file versioning operation. Though the pattern of the name change may be different, the block-based writes may be similar, and may be monitored by the BBAR. Though the number of block-based writes at the three-week time period may be reflected in the model and the false positive may be avoided by no deviation from the block-based model of the updated signature.

FIG. 1 depicts the representative major components of an example computer system 100 (alternatively, computer) that may be used, in accordance with some embodiments of the present disclosure. It is appreciated that individual components may vary in complexity, number, type, and/or configuration. The particular examples disclosed are for example purposes only and are not necessarily the only such variations. The computer system 100 may comprise a processor 110, memory 120, an input/output interface (herein I/O or I/O interface) 130, and a main bus 140. The main bus 140 may provide communication pathways for the other components of the computer system 100. In some embodiments, the main bus 140 may connect to other components such as a specialized digital signal processor (not depicted).

The processor 110 of the computer system 100 may be comprised of one or more cores 112A, 112B, 112C, 112D (collectively 112). The processor 110 may additionally include one or more memory buffers or caches (not depicted) that provide temporary storage of instructions and data for the cores 112. The cores 112 may perform instructions on input provided from the caches or from the memory 120 and output the result to caches or the memory. The cores 112 may be comprised of one or more circuits configured to perform one or more methods consistent with embodiments of the present disclosure. In some embodiments, the computer system 100 may contain multiple processors 110. In some embodiments, the computer system 100 may be a single processor 110 with a singular core 112.

The memory 120 of the computer system 100 may include a memory controller 122. In some embodiments, the memory 120 may comprise a random-access semiconductor memory, storage device, or storage medium (either volatile or non-volatile) for storing data and programs. In some embodiments, the memory may be in the form of modules (e.g., dual in-line memory modules). The memory controller 122 may communicate with the processor 110, facilitating storage and retrieval of information in the memory 120. The memory controller 122 may communicate with the I/O interface 130, facilitating storage and retrieval of input or output in the memory 120.

The I/O interface 130 may comprise an I/O bus 150, a terminal interface 152, a storage interface 154, an I/O device interface 156, and a network interface 158. The I/O interface 130 may connect the main bus 140 to the I/O bus 150. The I/O interface 130 may direct instructions and data from the processor 110 and memory 120 to the various interfaces of the I/O bus 150. The I/O interface 130 may also direct instructions and data from the various interfaces of the I/O bus 150 to the processor 110 and memory 120. The various interfaces may include the terminal interface 152, the storage interface 154, the I/O device interface 156, and the network interface 158. In some embodiments, the various interfaces may include a subset of the aforementioned interfaces (e.g., an embedded computer system in an industrial application may not include the terminal interface 152 and the storage interface 154).

Logic modules throughout the computer system 100—including but not limited to the memory 120, the processor 110, and the I/O interface 130—may communicate failures and changes to one or more components to a hypervisor or operating system (not depicted). The hypervisor or the operating system may allocate the various resources available in the computer system 100 and track the location of data in memory 120 and of processes assigned to various cores 112. In embodiments that combine or rearrange elements, aspects and capabilities of the logic modules may be combined or redistributed. These variations would be apparent to one skilled in the art.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 2:
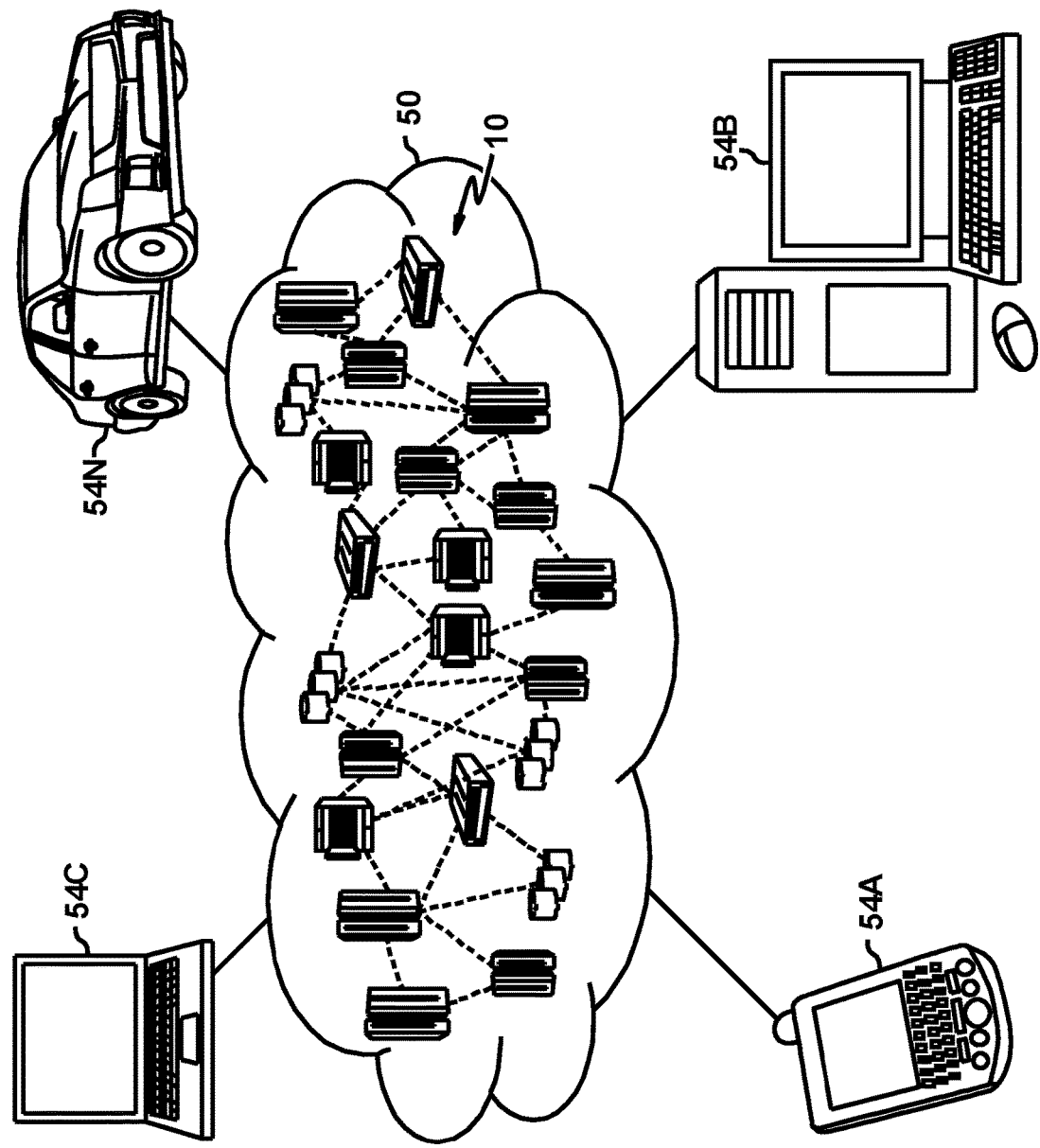
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
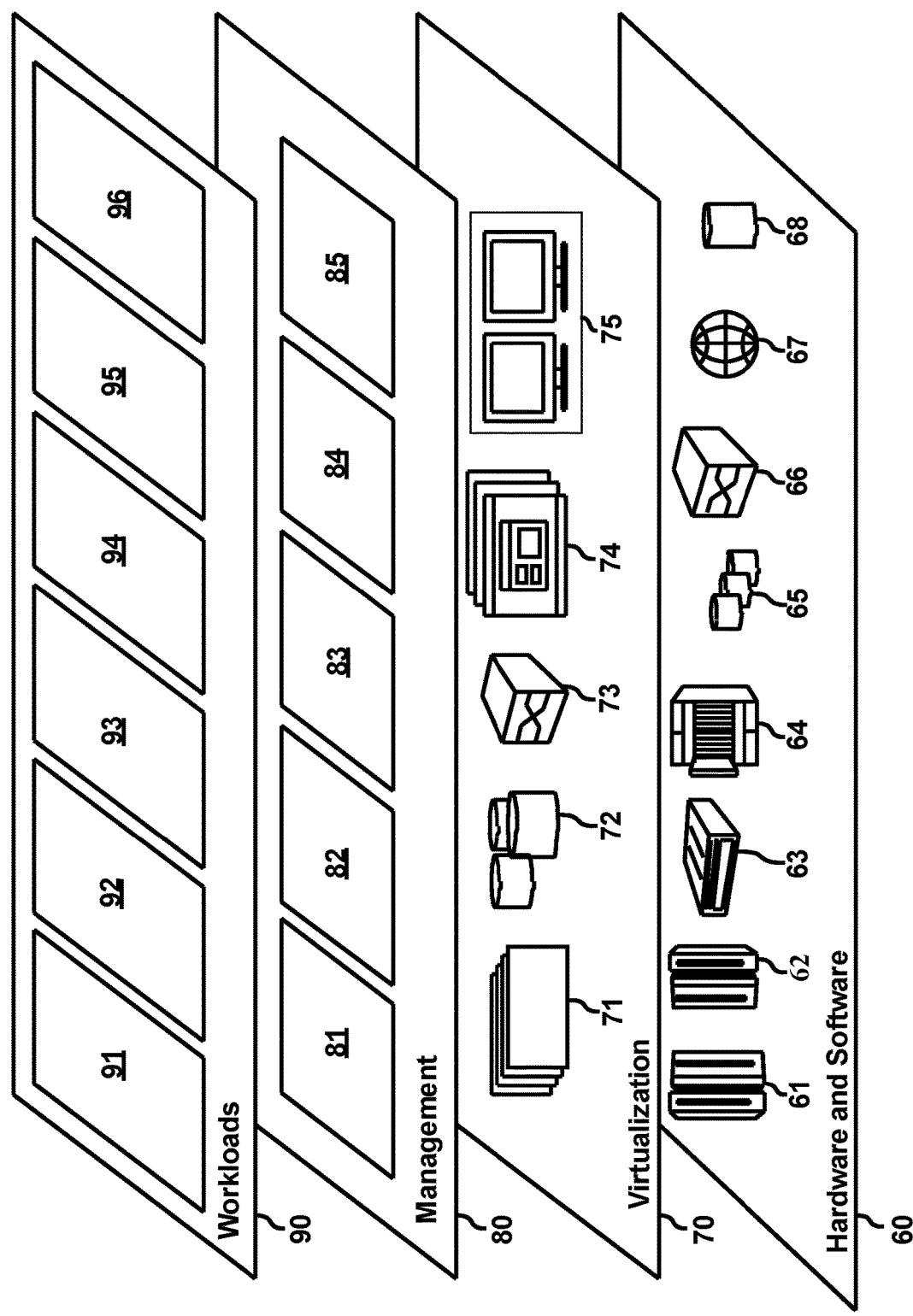
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and anomaly detection 96 including a BBAR.

Figure 4:
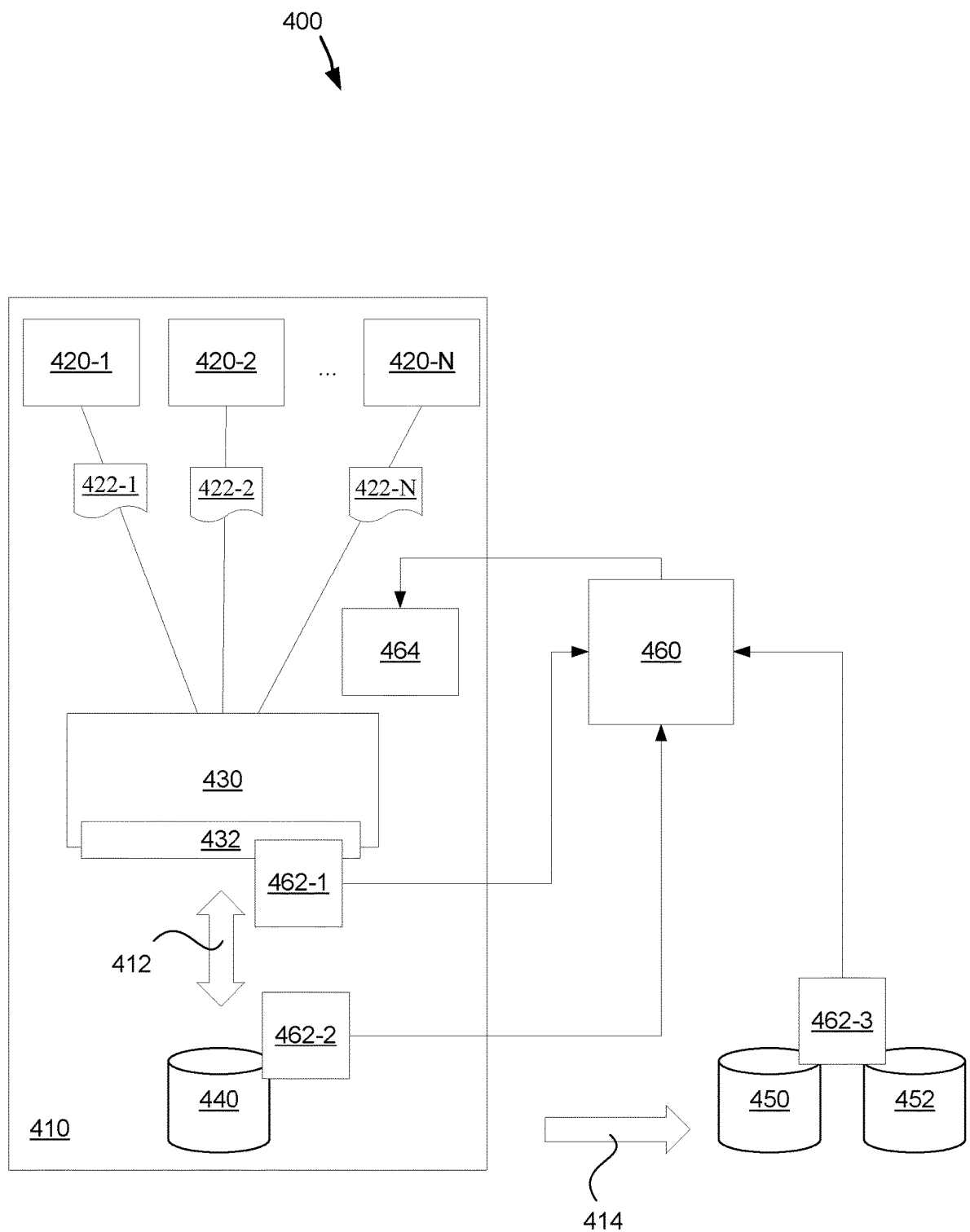
FIG. 4 depicts an example system of anomaly response consistent with some embodiments of the disclosure.

FIG. 4 depicts an example system 400 of anomaly response consistent with some embodiments of the disclosure. The system 400 may implement anomaly response through a BBAR 460 to monitor and determine security anomalies in an application/file-agnostic block-level manner consistent with some embodiments of the disclosure.

The system 400 may operate on a computer system 410. The computer system 410 may include the following: a plurality of executing software applications 410-1, 420-2, up to 420-N (collectively, 420) (alternatively, applications); an operating system 430 for facilitating resource allocation and communication of the software application; and one or more storage devices 440. The computer system 410 may be a computer having one or more other components, such as computer system 100 of FIG. 1 having processor 110 and memory 120. The computer system 410 may be a virtual machine hosted by a cloud provider, such as cloud computing environment 50 of FIG. 2.

The plurality of executing software applications 410 may have associated files, folders and metadata 422-1, 422-2, up to 422-N (collectively, 422) (alternatively, files). The applications 420 may include user level applications and services operated by users. The files 422 may be in the form of named files, folders, metadata, tables, and the like.

The operating system 430 may operate to facilitate the reading and writing of the files 422 for the applications 420. In some embodiments, applications 420 may write to the underlying data storage via some sort of named files or pipes that reside on some type of file system. In some embodiments, applications 420 may also read and write directly to raw block and character devices, if the underlying device they are accessing supports these operations. The operating system 430 may include an input/output (I/O) subsystem 432 that includes a plurality of device drivers (not depicted). The plurality of device drivers may include storage device drivers, logical volume managers and the like. The I/O subsystem 432 may be leveraged by the operating system 430 or the applications 420 for writing to the storage. Thus, the computer system 410 may perform accesses 412 to the storage devices 430, by way of the I/O subsystem 432 in the form of blocks of data. In one example, access 412 may be performing a storage in a block of data based on a write to a given file 422 from a given application 420. In another example, access 412 may be the performing of a retrieval of a block of data based on a read from a given application 420 to a given file 422.

The computer system 410, may perform a series of data recovery operations. For example, a backup 414 may be performed by the computer system 410. The backup 414 may include the moving of data from the storage devices 440 to the disaster recovery datastore 450. The backup to the disaster recovery datastore 450 may be performed simultaneously, or nearly contemporaneously with the updates by the computer system 410. For example, every three minutes the backup 414 operation may be performed. In another example, every 200 milliseconds the backup 414 operation may be performed. The data recovery operations may also be in the form of snapshotting. For example, a cyber resiliency datastore 452 may store a snapshot of the backups from the computer system 410. Specifically, the cyber resiliency datastore 452 may only permit backups in the form of snapshots but may not permit other types of accesses. For example, if a file is written to or otherwise updated on the storage devices 440 or on the disaster recovery datastore, that update does not modify an existing version of the file that resides on the cyber resiliency datastore 452. Instead, a new versioned file may be created on the snapshot that incorporates the writes and updates from the storage devices 440 and/or the disaster recovery datastore 450. By versioning, any anomalies that are performed on the computer system 410 do not irrevocably damage or otherwise alter the cyber resiliency datastore 452. The cyber resiliency datastore 452 may be performed on cloud object storage, such that it is practically impossible to update existing backups of files but only to create snapshots. For example, virtual storage 72 of FIG. 3, may obfuscate the data blocks that are written to such that only snapshots may be created.

The BBAR 460 may be implemented to monitor and determine if there is a security anomaly related to the computer system 410. The BBAR 460 may include one or more trackers 462-1, 462-2, and 462-3 (collectively, 462). The trackers 462 may reside on the computer system and may monitor all aspects of operation of the computer system. Specifically, the trackers 462 may be software, hardware, or some specialized combination thereof (e.g., firmware) that operate at a privileged level inside of the computer (e.g., a hypervisor, supervisor, kernel level task, and the like). For example, tracker 462-1 may be embedded at a device driver level to monitor the movement of block-based data in real time within the operating system 430. In another example, tracker 462-2 may operate by monitoring the block-based data at rest on the storage devices 440 of the computer system 410. In yet another example, tracker 462-3 may monitor the disaster recovery datastore 450 and the cyber resiliency datastore 452.

The BBAR 460 may ingest both the updated and static data of the computer system 410. For example, The BBAR 460 may keep track of blocks which do not have any data (e.g., data is null or junk data), and blocks which are modified. The BBAR 460 may keep track of the modification, writing, or other updating of a given block with its timestamp. Further, the BBAR 460 may operate in coordination with the data recovery operations of the computer system 410—for example, if snapshot policy is scheduled to take snapshot at every hour. Then tracker 462-3 may capture all the modified and null data blocks for the entire hour. The analytics capture may allow for the BBAR 460 to perform an analysis not only on the data blocks but also on the number of changes by comparing storage to a snapshot of that storage to make various determinations on updates (e.g., size of updates in blocks, number of updates on blocks, etc.).

The BBAR 460 does not assume it will be accessed through a file system, and it has no knowledge of the applications or files that are being accessed. Usually a device of the storage devices 440 may be accessed by a given application 420, so the application will open a given file 422, and begin reading or writing data to the file, without regard to how the file system is storing the data or representing it internally. These I/O can be tracked, and the corresponding block being changed or accessed can be tracked by the BBAR 460.

The BBAR 460 may operate continuously to ingest, monitor and process the information of the computer system 410 at a block level. For example, the BBAR 460 may retrieve from the trackers 462 information on what data gets modified in the storage devices 440, 450, and 452. This information may be gathered by identifying and tracking the access activity for the configured storage mediums individually or as a whole. In some embodiments, this may be through leveraging the driver level portion of the I/O subsystem 432 where all the I/O requests get multiplexed, which may facilitate tracking all the input-output requests from all the applications 420 accessing the storage devices 440. At the driver level, an I/O operation may reach the changed tracker 462-1 in the form of an invocation of either a read or write operation and there are specific entry points corresponding to each read and write operation. At this level, the I/O subsystem 432 is interested in the changed blocks and hence tracks all write operations at the block level.

The drivers and the I/O subsystem 432 may rely on a file-to-block or block-to-file mapping for translation of files 432 to blocks; all writes may be performed at the block level. All I/O of the computer system 410 may necessarily pass through the drivers of the I/O subsystem 432 and through the file-to-block mapping or block-to-file mapping. For example, a Linux® storage subsystem may pass through a BIO structure, which contains all the information necessary to perform the I/O operation to storage from the inode information of the Linux kernel. The BIO structure may be the basic container for block I/O within the Linux kernel. The BIO structure may be used to identify and maintain information on the what blocks were changed.

The BBAR 460 may perform a training or modelling of the data to generate a signature. For example, a training period may be five days, thirty days, or even an eight-hour period. During the training period, the BBAR 460 may collect all the data for the computer system 410. The training may yield information on block level changes based on frequency of changes. The BBAR 460 may gather all the snapshot data at each block level and may perform frequency analysis for each block that is modified. An example of the gathered information is depicted in the following Table 1.

TABLE 1

| BlockID | 2019 Nov. 1 10:00 | 2019 Nov. 1 11:00 | 2019 Nov. 1 12:00 | 2019 Nov. 1 13:00 | 2019 Nov. 1 14:00 |
| --- | --- | --- | --- | --- | --- |
| BlockID1 | 3 | 0 | 7 | 4 | 0 |
| BlockID2 | 2 | 3 | 1 | 2 | 1 |
| BlockID3 | 6 | 7 | 2 | 6 | 5 |
| BlockID4 | 1 | 1 | 4 | 3 | 1 |
| BlockID5 | 0 | 2 | 3 | 0 | 2 |
| BlockID6 | 3 | 4 | 2 | 1 | 2 |
| BlockID7 | 7 | 3 | 0 | 0 | 5 |
| BlockID8 | 1 | 2 | 3 | 1 | 2 |
| BlockID9 | 2 | 6 | 6 | 7 | 2 |
| BlockID10 | 4 | 1 | 1 | 3 | 2 |

Using Table 1 above, a first snapshot has been taken at 10:00 am on Nov. 1, 2019. The snapshot depicts the number of times each of the blocks are modified in an hour. Likewise, snapshots have been taken for each hour. The BBAR 460 may operate based on the block information to determine a pattern of access at a specific time. For example, and based on the data in Table 1, the BBAR 460 may determine that the number of accesses at 10:00 am are six accesses to BlockID2. The BBAR 460 may also determine a range of accesses from 10:00 am to 2:00 pm of between two and seven accesses. The BBAR 460 may generate a signature of block-based access based on the writes collected from the analytics from Table 1. The signature may include information about the number of writes, the frequency of writes, the cumulative number of writes, the range of accesses, and the like. The signature may also include other higher-order information about the block-based access pattern. For example, the signature may include the mean number of writes for a single time period, or a larger time period. The signature may include the standard deviation from the mean number of writes. The signature may include the total or aggregate number of writes to a block, or to a group of blocks, or to the total number of blocks of a given storage device, the total storage devices 440, the data recovery datastore 450, or the entirety of the computer system 410.

The BBAR 460 may use the signature to perform anomaly determination, detection, and response actions for security anomalies. For example, the BBAR 460 may continue to monitor the block-based operation of the computer system 410. Specifically, the BBAR 460 may monitor the write operations of various blocks to the storage devices 440 of the computer system. The BBAR 460 may compare the block-based accesses, such as to a first subset of blocks, to the signature that was generated during the training phase. If there is a deviation from the signature, the BBAR 460 may determine that there is a security anomaly. The determination is made at the block level, and without access to the names of files, the metadata associated with files, and without knowledge of similar information (e.g., without access to or analysis of process IDs, schedules, RAM address accesses, filenames, text strings, and the like). The determination may be based on a range of values and a deviation from that range. For example, if a number of writes to a particular block is greater than a maximum number of writes, or less than a minimum number of writes, a security anomaly may be determined. The deviation may be based on the bounded rationality. The deviation may be based on the standard deviation. For example, a number of writes that are greater than the standard deviation of the mean of writes for a particular period of time (e.g., every hour, every four hours, every eleven hours, etc.).

The BBAR 460, may based on determining that there is a security anomaly, perform a security action related to the computer system 410. The security action may be performed outside of the computer system, such as by sending a notification or a message to a user to intervene and verify the integrity of the computer system 410. The security action may be performed in the computer system. For example, the BBAR 460 may initiate an internal security action 460. The internal security action 460 may be a lock of processing or a message to the operating system 430 about the security anomaly. The internal security action 460 may be the execution of an antivirus program on the computer system 410 to verify the anomaly was in fact a security anomaly.

The security action may be performed based on a specific file, folder, or application of the computer system 410. The BBAR 460 may retrieve the block-to-file mapping and/or the file-to-block mapping from the I/O subsystem 432 of the computer system 410. Upon determining that there is a security anomaly, the BBAR 460 may identify the blocks that are modified that deviate from the baseline of the signature. The BBAR 460 may use the identified blocks and the mapping from the I/O subsystem 432 to translate the block format into a file, filename, location, application, and the like information.

Figure 5:
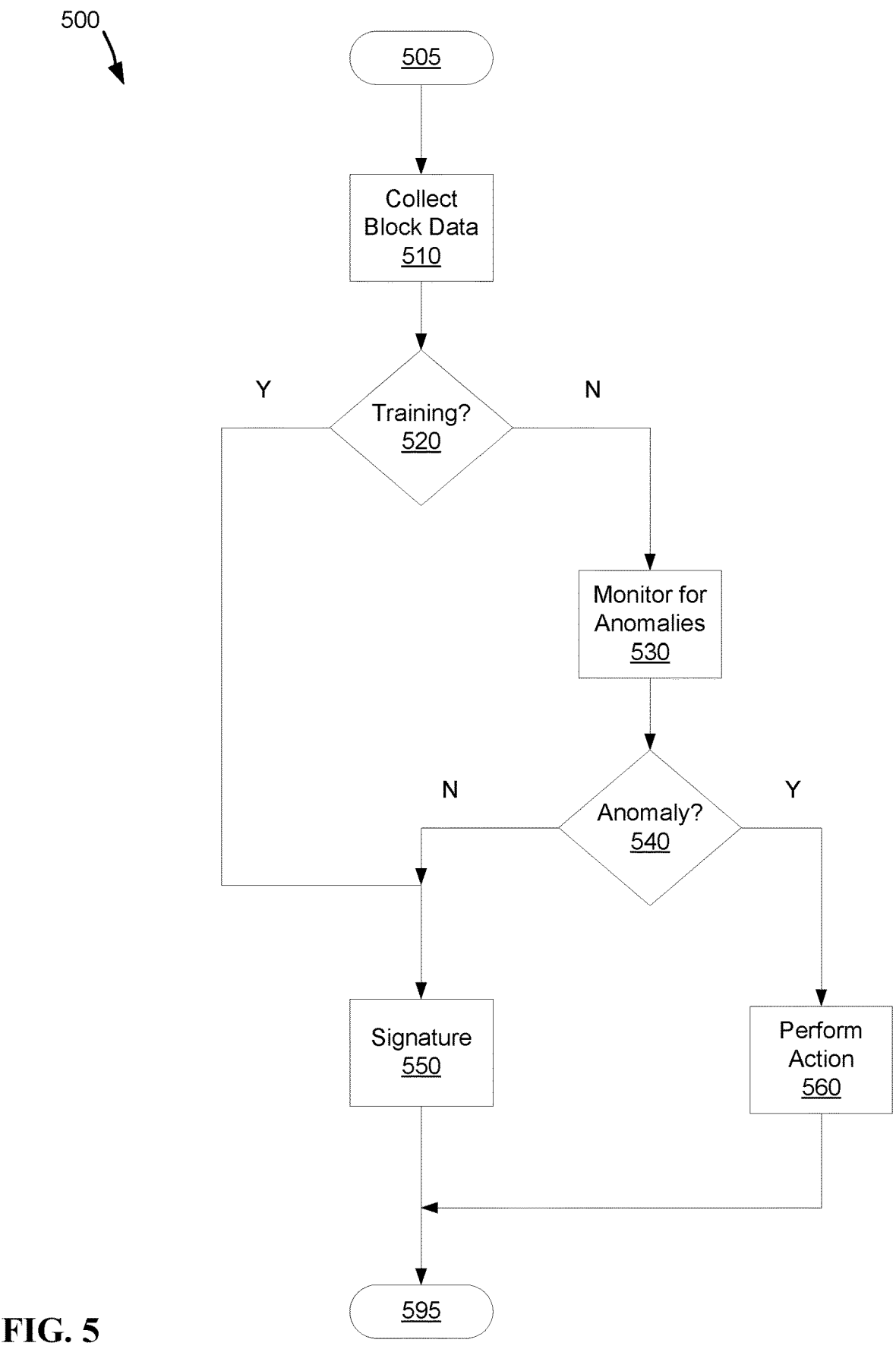
FIG. 5 depicts an example method of monitoring a computer system for security anomalies, consistent with some embodiments of the disclosure.

FIG. 5 depicts an example method 500 of monitoring a computer system for security anomalies, consistent with some embodiments of the disclosure. Method 500 may be performed by a computer system, such as computer system 100 of FIG. 1. Method 500 may be performed by a BBAR, such as BBAR 460 of FIG. 4. Method 500 may be performed continuously; for example, method 500 may be performed and at its end 595, method 500 may be immediately repeated. Method 500 may be performed at a preset interval, such as every ten minutes, every fifteen minutes, every hour; embodiments of the disclosure contemplate method 500 to execute at many different intervals.

From start 505, a BBAR may operate by collecting block data of a computer system, such as BBAR 460. The collection of block data may be based on a snapshot operation of a data backup or cyber resiliency operation. For example, a backup of block data may be performed by disaster recovery data store 450 or cyber resiliency datastore 452 of FIG. 4. The collected block data may be in the form of value data. For example, the collected block data may come from a storage snapshot that includes a listing of new values for every block of the storage devices of a computer system, such as the storage device 440 of computer system 410 of FIG. 4. The collected block data may be in the form of change data. For example, an initial state may be provided to the BBAR and at every snapshot, only those blocks that are changed may be provided. The snapshotting and collecting of data may be based on a preexisting schedule, such as every hour.

At 520 it may be determined if it is a training period for training a model of the operation of the computer system. If it is a training period, at 520:Y, a signature of the computer system may be generated at 550. The signature may be generated based on block level write patterns. For example, the signature may include the number of writes at the time period that the data was collected at 510. The signature may be updated at generation 550. For example, method 500 may have previously operated to generate the signature at a first instance of method 500, and in a second instance of method 500, operation 550 may generate the signature to include data from a second time that data was collected. The generation of the signature may also include the performance of identifying trends, ranges, and other higher order information about the block data of the computer system. For example, a range of block writes over a time period (e.g., minutes, hours) may be written to the signature.

If it is not a training period, at 520:N, the BBAR may operate by monitoring the computer system for anomalies at 530. The monitoring of anomalies may be performed at the block level of data. For example, BBAR 460 may monitor storage devices 440, 450, and 452 to determine if there are any writes, or changes to writes that are performed on various blocks. At 540, the BBAR may operate to determine if there is a security anomaly. The determination may be performed without knowledge of any information of the content of the data represented by the block data. For example, the block data may represent a file name, a location, an application process identifier, file description and permission metadata, and the like. The BBAR may compare the block data without knowledge, understanding, or otherwise accessing this content.

The determination may be made by the BBAR comparing the number of writes at a particular period of time, to the signature of the storage devices. For example, at the time of a snapshot and after a training period, the BBAR may determine that there is a security anomaly by comparing the number of writes of a given block based data of a first storage device, to the same block based data of the first storage device for the same given block in the model of the signature. The security anomaly may be determined when the comparison indicates that a number of writes is outside of a range of values of the signature—for example, if the number of writes is one write at a snapshot, and the range of snapshots is five to thirty-seven block writes. In another example, if a mean number of block writes equals nine, and a standard deviation of block writes is three, evaluating that a value of block writes of seventeen is a security anomaly.

If there is a security anomaly determined, 540:Y, the BBAR may perform a security action at 560. If there is not a security anomaly determined, at 540:N, the BBAR may continue to generate the signature. For example, a new snapshot of a storage device may be performed by copying block updates as well as the metadata that indicates the number of block writes to each block that has been updated since the last snapshot. The block-based data may be collected outside of a training environment, and the BBAR may be monitoring for anomaly detection. A first given block may have a range of anywhere from three to seventy-eight writes during the training period, with a standard deviation of twelve writes from a mean of fifty writes. A new snapshot of block write data including the first given block may be processed by the storage devices and monitored by the BBAR at 530. The BBAR may identify that the first given block had sixty-seven writes for the new snapshot. Though an anomaly was not identified, at 540, the signature may be updated with a new mean of fifty-four writes, and a new standard deviation of thirteen writes may be added to the model of block writes of the signature at 550 after the determination of no anomaly, at 540:N. After the signature is generated at 550, or after the security action is performed at 560, method 500 ends at 595.

Figure 6:
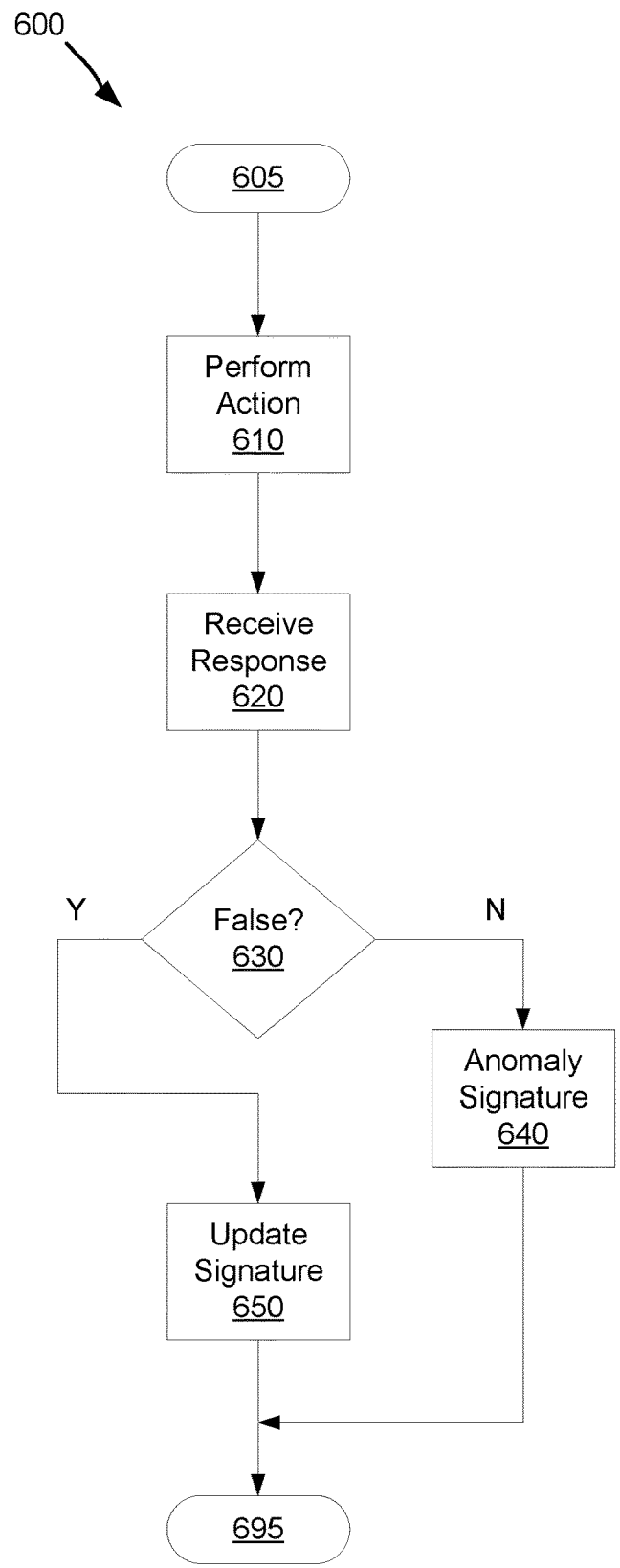
FIG. 6 depicts an example method of updating block-based signature information responsive to performing a security action, consistent with some embodiments of the disclosure.

FIG. 6 depicts an example method 600 of updating block-based signature information responsive to performing a security action, consistent with some embodiments of the disclosure. Method 600 may be performed by a computer system, such as computer system 100 of FIG. 1. Method 600 may be performed by a BBAR, such as BBAR 460 of FIG. 4. Method 600 may be performed responsive to determining a security anomaly on a computer system, for example by a BBAR 460 in response to determining a security anomaly on computer system 410.

From start 605, the security action may be performed at 610. The security action may be performed by notifying a user of a BBAR or computer system of a determined security anomaly. For example, BBAR 460 of FIG. 4 may determine that computer system 410 is experiencing a security anomaly based on a particular block-based access to one or more blocks of storage devices 440. The BBAR 460 may generate an error, notification, or other relevant message that communicates that an anomaly was detected by the BBAR. The communication to the user may include the block information related to the security anomaly, such as the number and other identifiers of the blocks. The communication may be made without information about the content of the blocks, such as file names and the like. The security action may be initiating a secondary software program to scan for the security anomaly. The secondary program may be an antivirus program configured to perform a virus scan of a storage device identified by the BBAR as potentially containing a security anomaly. The secondary program may be an antimalware program, or intrusion detection software, configured to monitor for and detect malware, or unauthorized network communication, respectively. The security action may be transmission of a notification to an elevated privilege application of a computer system. For example, BBAR 460 may perform the security action at 610 by communicating to a hypervisor of computer system 410 regarding the determined security anomaly.

At 620 a response to the security action may be received. The response that is received may be an indication that there is a false positive regarding the block-based detection of the security anomaly. For example, an administrative user may indicate that the security anomaly was related to benign behavior such as a disk defragmentation, or other maintenance operation. In another example, an antivirus program may respond indicating that no virus was found based on the virus scan. In yet another example, a hypervisor may indicate that a table migration of data was performed and that no anomalous behavior was performed. The response that is received may be an indication that there is a security anomaly detected. For example, an administrative process may indicate that a particular folder of data or file has been maliciously encrypted.

If there is a false positive, at 630:Y, the BBAR may operate by updating the signature of the computer system. For example, the BBAR may update the range of values that are performed on a block. In another example, the BBAR may calculate a new mean of block accesses of a particular block that are indicative of normal operation of a computer system and may update the signature of the computer system by updating the mean range for the particular block. If there is not a false positive, at 630:N, the BBAR may operate by generating an anomaly signature at 640. Generation of an anomaly signature may include appending information to the block-based baseline signature of a given computer system to indicate compromised operation. For example, the signature of a first computer system may include a table of data for a first storage device. The table may include a row for each block of the storage device, and the rows may have columns for each operation during a training period or during a non-anomalous period operation that includes the number of writes to the block. The table may be updated at 640 to add a new column (or update an existing column) indicative of the number of writes during anomalous operation.

As part of performing the anomaly signature generation at 640, the BBAR may increase the frequency of recording or sampling of block-based writes to determine a more fine-grained signature of the storage device. For example, the BBAR may begin to sample data every hour during normal operation and before anomalous detection. After an anomaly is determined, the BBAR may begin to sample the number of block writes every twelve minutes. The anomaly signature generation at 640, may include instructing other parts of a computer system to operate with a different frequency. For example, computer system 410 may operate without a block-based anomaly detection by performing a backup to disaster recovery datastore 450 every hour. If BBAR 460 determines a block-based anomaly, BBAR may instruct computer system 410 to perform a backup to disaster recovery datastore 450 every three minutes, and for cyber resiliency datastore 452 to perform a snapshot every five minutes. After the signature is updated at 650, or the anomaly signature is generated at 640, method 600 ends at 695.

Figure 7:
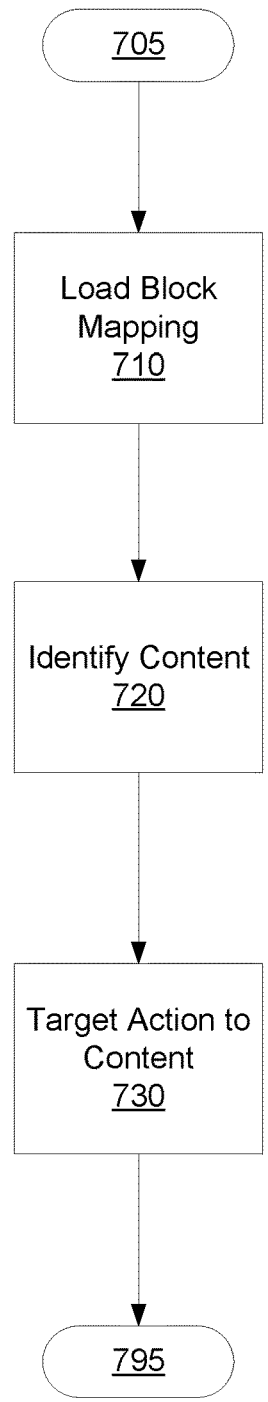
FIG. 7 depicts an example method of performing a security action based on data content of a computer system, consistent with some embodiments of the disclosure.

FIG. 7 depicts an example method of performing a security action based on data content of a computer system, consistent with some embodiments of the disclosure. Method 700 may be performed by a computer system, such as computer system 100 of FIG. 1. Method 700 may be performed by a BBAR, such as BBAR 460 of FIG. 4. Method 700 may be performed responsive to determining a security anomaly on a computer system, for example by a BBAR 460 in response to determining a security anomaly on computer system 410. Method 700 may be performed to provide more granularity to one or more components of a computer system in response to anomaly detection. For example, an anomaly may be determined solely based on block-based data. By performing the security action with data content of the storage device, a user or other component of the computer system may be able to act in a more targeted manner.

From start 705, a mapping may be loaded at 710. The mapping may be identified by a BBAR after security anomaly determination. For example, out of a storage device containing 35 million blocks, a BBAR may identify a security anomaly on blocks 8,675,200 and 8,675,309. The security anomaly may be in the form of a deviated number of block writes to these particular block identifiers. The BBAR may request the block mapping from a program of the computer system, such as an I/O subsystem, a storage driver, a logical volume manager, a hypervisor, and the like. The mapping may be a block-to-file mapping or a file-to-block mapping used by the computer system to perform writes of local files, folders, and metadata, into a block-based format for the storage device.

At 720 a content related to the one or more blocks may be identified. The content may be file information that is stored on the storage device. The content may include, as an example, any one or more of the following: files, folders, universal resource locations, tables, metadata, extended attributes, version information, process identifiers, permission information, and the like. The file information of the content may indicate that particular files are modified, updated, or otherwise accessed, by the block-based data. the identification may be performed by a lookup operation. For example, a BBAR may, based on the block identifiers and a block-to-file mapping, perform a lookup of the name of one or more files located on the storage device. In some embodiments, the BBAR may identify content by performing a reverse lookup operation. For example, the mapping may be a file-to-block mapping creating by a filesystem driver of a computer system. The BBAR may utilize the file-to-block mapping to lookup the relevant matching files that are located on the storage device. The content related to the one or more blocks may then be identified by the BBAR.

At 730, a security action may be targeted to content. For example, if the BBAR was configured to notify a super user of a security anomaly, the content in the form of one or more files may be embedded into the message that was generated. In another example, if the BBAR was configured to initiate a virus scan of an antivirus program, the identified content may identify a set of files that are located in three directories that have been identified by the BBAR as a security anomaly. The BBAR may instruct the antivirus software to perform a virus scan of only the three directories, and to ignore any directories that are not the location of the set of files that are identified by the block-based determination. After the action is targeted to the content at 730, method 700 ends at 795.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A method comprising:
   monitoring, by an anomaly response system, a plurality of blocks of a first storage device, the first storage device related to a computer system;
   comparing, by the anomaly response system, a subset of blocks of the plurality to a first storage signature of the first storage device;
   determining, by the anomaly response system and based on the comparing the subset of blocks, a security anomaly on the computer system; and performing, by the anomaly response system and in response to the security anomaly, a security action related to the computer system, wherein the performing the security action comprises:
   retrieving, by the anomaly response system, a block-to-file mapping, the block-to-file mapping relates file information to the plurality of blocks of the first storage device; and
   identifying, by the anomaly response system and based on the block-to-file mapping, one or more files that correspond to the subset of blocks of the plurality.

2. The method of claim 1, wherein the comparing the subset of blocks of the plurality to the first storage signature occurs at a second time, and wherein the method further comprises:
   monitoring, by the anomaly response system, one or more storage devices at a first time that precedes the second time, the one or more storage devices related to the computer system, the one or more storage devices including the first storage device; and
   generating, based on the plurality of blocks of the first storage device at the first time, the first storage signature of the first storage device.

3. The method of claim 1, wherein the first storage signature is based on a range of block writes to the subset of blocks of the first storage device.

4. The method of claim 3, wherein the security anomaly is determined based on a number of block writes to the subset of blocks being outside of the range.

5. The method of claim 3, wherein the security anomaly is related to a standard deviation of the range of block writes.

6. The method of claim 1, wherein the security anomaly of the computer system is determined without information of a name of any files of the computer system.

7. The method of claim 1, wherein the security anomaly of the computer system is determined without awareness of a folder of any files of the computer system.

8. The method of claim 1, wherein the security anomaly of the computer system is determined without access to any content of any files of the computer system.

9. The method of claim 1, wherein the security anomaly of the computer system is determined without access to an application that operates on files of the computer system.

10. The method of claim 1, wherein the security action comprises:
   notifying, by the anomaly response system, a user of the security anomaly related to the one or more files.

11. The method of claim 10, wherein the method further comprises:
   receiving, by the anomaly response system, a response regarding the one or more files, wherein the response indicates that the security anomaly was a false positive; and
   updating, based on the comparing the subset of blocks and based on the response regarding the one or more files, the first storage signature of the first storage device to avoid the false positive.

12. The method of claim 1, wherein the method further comprises:
   initiating, by the anomaly response system, a virus scan by an antivirus program, the virus scan of the one or more files.

13. The method of claim 12, wherein the method further comprises:
   receiving, by the anomaly response system, a response from the antivirus program, wherein the response indicates that the security anomaly was a false positive; and
   updating, based on the comparing the subset of blocks and based on the response regarding the one or more files, the first storage signature of the first storage device to avoid the false positive.

14. A system comprising:
   a memory, the memory containing one or more instructions; and
   a processor, the processor communicatively coupled to the memory, the processor, in response to reading the one or more instructions, configured to:
      monitor a plurality of blocks of a first storage device, the first storage device related to a computer system;
      compare a subset of blocks of the plurality to a first storage signature of the first storage device;
      determine, based on the comparing the subset of blocks, a security anomaly on the computer system, wherein the security anomaly comprises a threat toward the computer system; and
      perform, in response to the security anomaly, a security action related to the computer system, wherein the performing the security action comprises:
         retrieve, by an anomaly response system, a block-to-file mapping, the block-to-file mapping relates file information to the plurality of blocks of the first storage device; and
         identify, by the anomaly response system and based on the block-to-file mapping, one or more files that correspond to the subset of blocks of the plurality.

15. The system of claim 14, wherein the comparing the subset of blocks of the plurality to the first storage signature occurs at a second time, and wherein the processor is further configured to:
   monitor one or more storage devices at a first time, the one or more storage devices related to the computer system, the one or more storage devices including the first storage device; and
   generate, based on the plurality of blocks of the first storage device at the first time, the first storage signature of the first storage device; and
   wherein the security anomaly of the computer system is determined without knowledge of a name of any files of the computer system.

16. The system of claim 14, wherein the security action comprises one of:
   a lock of processing of the computer system;
   a message to an operating system of the computer system;
   running an antivirus program on the computer system; and
   transmission of a notification to an elevated privilege application of the computer system.

17. A computer program product, the computer program product comprising:
   one or more computer readable storage media; and
   program instructions collectively stored on the one or more computer readable storage media, the program instructions configured to:
      monitor a plurality of blocks of a first storage device, the first storage device related to a computer system;
      compare a subset of blocks of the plurality to a first storage signature of the first storage device;
      determine, based on the comparing the subset of blocks, a security anomaly on the computer system; and
      perform, in response to the security anomaly, a security action related to the computer system, wherein the performing the security action further comprises:

retrieve, by an anomaly response system, a block-to-file mapping, the block-to-file mapping relates files and files to the plurality of blocks of the first storage device; and identify, by the anomaly response system and based on the block-to-file mapping, one or more files that correspond to the subset of blocks of the plurality.

18. The computer program product of claim 17, wherein the program instructions are further configured to:

initiating, by the anomaly response system, a virus scan by an antivirus program, the virus scan of the one or more files.

* * * * *